United States Patent [19]
Foster

[11] Patent Number: 4,577,816
[45] Date of Patent: Mar. 25, 1986

[54] VACUUM-PACKED SURVIVAL EQUIPMENT

[75] Inventor: Gordon T. Foster, La Habra, Calif.

[73] Assignee: Gulf & Western Manufacturing Company, Southfield, Mich.

[21] Appl. No.: 525,574

[22] Filed: Aug. 22, 1983

Related U.S. Application Data

[63] Continuation-in-part of Ser. No. 318,328, Nov. 5, 1981, abandoned.

[51] Int. Cl.[4] ............................................. B64D 17/40
[52] U.S. Cl. .................................. 244/148; 244/149; 441/42; 383/113; 206/524.8
[58] Field of Search .................... 244/147, 148, 149; 441/42; 206/524.8, 522, 634, 497; 383/109, 113, 119

[56] References Cited

U.S. PATENT DOCUMENTS

| | | | |
|---|---|---|---|
| 1,909,158 | 5/1933 | Albihn | 244/147 |
| 2,161,093 | 6/1939 | Salfisberg | 206/634 |
| 2,542,206 | 2/1951 | Nichols | 206/524.8 |
| 3,494,457 | 2/1970 | Titchenal | 383/119 |
| 3,559,800 | 2/1971 | Butler | 206/629 |
| 3,584,815 | 6/1971 | Stencel | 244/149 |
| 3,712,568 | 1/1973 | Grasso et al. | 244/148 |
| 4,136,205 | 1/1979 | Quattlebaum | 206/524.8 |
| 4,169,568 | 10/1979 | Drew et al. | 244/148 |
| 4,239,111 | 12/1980 | Conant et al. | 383/119 |
| 4,457,730 | 7/1984 | Foster et al. | 441/42 |

FOREIGN PATENT DOCUMENTS 3036796 1/1983 Fed. Rep. of Germany ........ 441/42

Primary Examiner—Trygve M. Blix
Assistant Examiner—Rodney Corl
Attorney, Agent, or Firm—A. Thomas Kammer

[57] ABSTRACT

A vacuum-packed assembly for the compact storage of compressible survival equipment is provided. The assembly includes a compressed article of survival equipment, such as a sleeping bag, life raft, or parachute within a flexible, evacuated, heat-sealed envelope of gas-impermeable material. An outer envelope of thicker, more durable material is preferably employed for protecting the inner envelope. The outer envelope is also evacuated. If a parachute is stored within the assembly, an actuation neck is provided for allowing the envelopes to be ruptured upon deployment of a drogue or pilot parachute. Both the drogue parachute and an aircrewman can be connected to the parachute externally of the vacuum envelopes without risking vacuum integrity.

17 Claims, 5 Drawing Figures

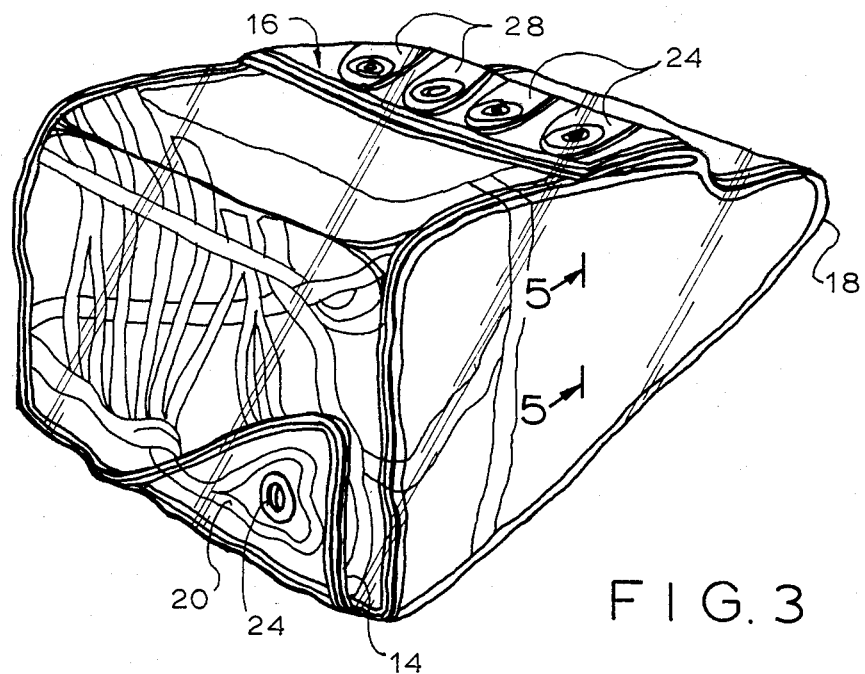
FIG. 3
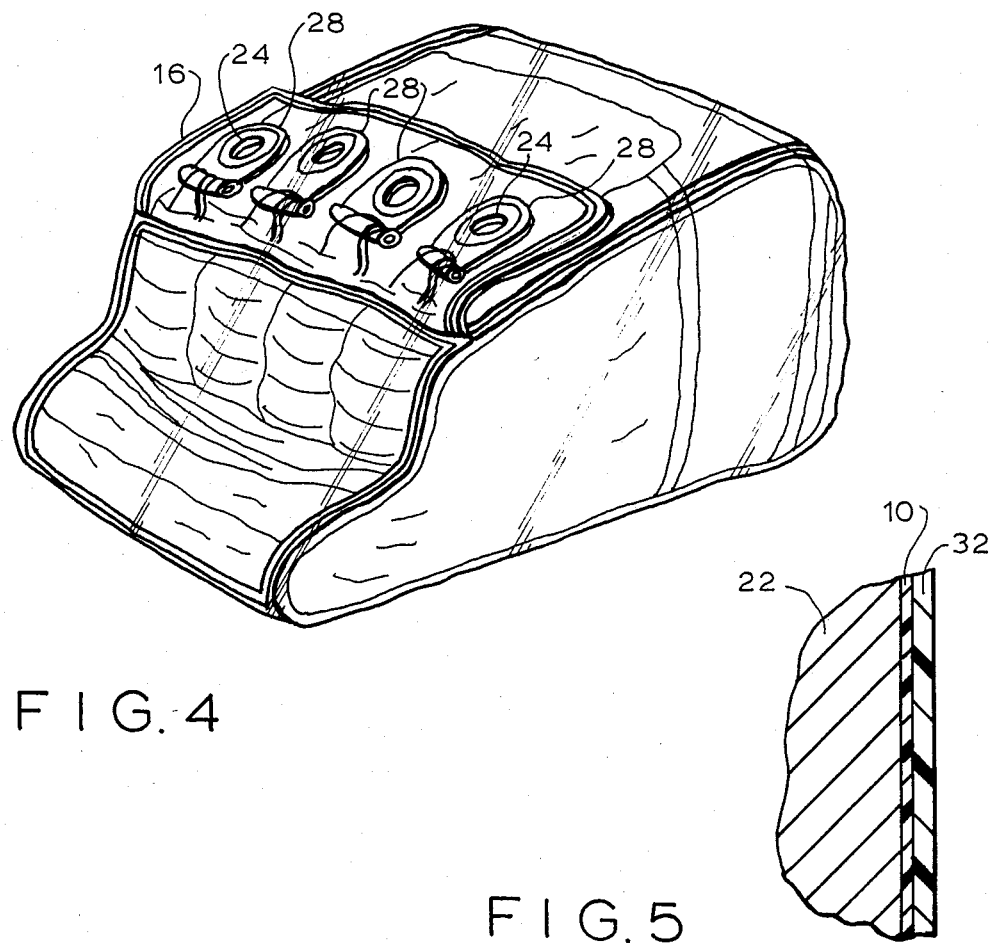
FIG. 4
FIG. 5

VACUUM-PACKED SURVIVAL EQUIPMENT

CROSS REFERENCE TO RELATED APPLICATION

This application is a continuation-in-part of U.S. Ser. No. 318,328 filed Nov. 5, 1981 now abandoned.

BACKGROUND OF THE INVENTION

1. Field of the Invention

The field of the invention relates to vacuum-packed survival equipment contained within a rupturable evacuated envelope.

2. Background of the Invention

Survival equipment such as parachutes for use in aircraft equipped with ejection seats have been stored in containers referred to as head boxes. Due to the limited amount of space in such aircraft, the parachute must be packed in a relatively small container. Insertion of the parachute within the head box has often been relatively difficult. Similar problems are encountered in the storage of life rafts, sleeping bags, and other such articles in an aircraft.

Prior to vacuum packing, the storage containers for such survival equipment did little to protect them from contaminants such as humidity, oil, water, grease, acids, aircraft fuel, and the effects of atmospheric changes. Consequently, periodic maintenance was required to keep the item in a state of readiness to insure the safety of the aircrewman. For example, each parachute assembly would have to be unpacked, aired, dried and inspected about three times per year. After this procedure was completed, it would be completely repacked prior to being returned to service. This continual maintenance, combined with the ongoing normal deterioration due to environmental exposure wears out a parachute in an unncessarily short time.

U.S. Pat. Nos. 3,584,815 and 3,712,568 both concern vcuum-packed parachutes. The former patent requires a pyrotechnic fuse to open the package and allow deployment. It is unclear how the package in the latter patent is opened.

SUMMARY OF THE INVENTION

A vacuum-packed assembly for storing compressible survival equipment is provided which will require no maintenance after initial packing and installation, and which can be deployed quickly and reliably. The assembly is designed for easy handling due to its greatly reduced size and the damage and puncture-resistant characteristics of the packaging which is employed. It may simply be placed in a rigid storage container and connected to the necessary rigging for attaching it to the aircrewman and deployment system.

One assembly disclosed herein includes a parachute, a flexible vacuum package containing the parachute, and means for connecting the parachute to external rigging without compromising the vacuum integrity of the package. Although the package is puncture-resistant, it can easily be opened when the parachute is to be deployed. This is accomplished by designing an actuation neck into the package which will cause it to rupture upon the application of a certain minimum force.

The package preferably includes two vacuum envelopes. The inner envelope is made from a relatively thin, gas-impervious material. After the parachute, life raft, or sleeping bag is placed therein, it is compressed to a significant degree and the envelope evacuated. The vacuum-packed parachute is then placed in the outer envelope which is evacuated until it forms a skin-tight relationship with the outer surface of the inner envelope. The outer envelope may be substantially heavier than the inner envelope to provide the necessary resistance to puncture or other damage. Since it only covers a package which is already reduced significantly in volume, the greater envelope thickness does not unduly add to the dimensions of the finished product.

Despite the strength of the double-envelope construction, the assembly is easily opened by pulling on an angled actuation neck located at a seam thereof. In the case of the deployment of a parachute, two portions of the parachute are connected through the envelopes to members which will exert opposing forces thereon. The envelopes will be ripped apart almost instantaneously upon exertion of these opposing forces.

A vacuum package for a life raft is disclosed in U.S. Pat. No. 4,457,730. In this application, a $CO_2$ cartridge is also included within the vacuum package. Upon tearing the vacuum envelope, this cartridge is activated. The rapid expansion of the raft causes the envelope to be ripped apart. The present invention is constructed such that it too will be ripped apart despite its superior resistance to damage from almost any source.

BRIEF DESCRIPTION OF THE DRAWINGS

FIG. 3 is a front perspective view of a vacuum packed parachute;

FIG. 4 is a rear perspective view thereof; and

FIG. 5 is a fragmentary sectional view thereof taken along the plane of line 5—5 in FIG. 3.

DETAILED DESCRIPTION OF THE INVENTION

An assembly is provided for the storage of compressible survival equipment such as parachutes, life rafts, and sleeping bags. While each of these items may include non-compressible components, they are for the most part compressible to a great degree and attain full recovery upon release of pressure applied thereto.

Figure 1:
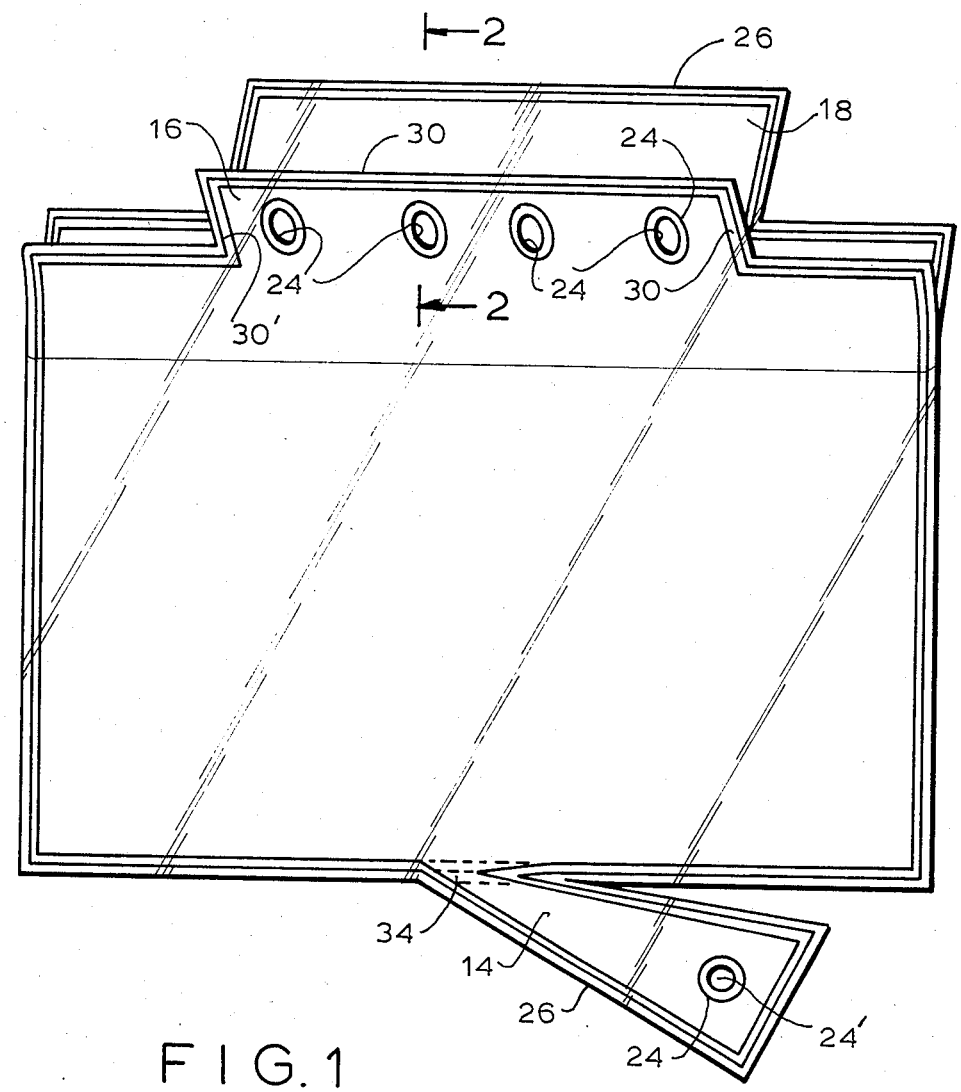
FIG. 1 is a perspective view of a vacuum envelope according to the invention.
Figure 2:
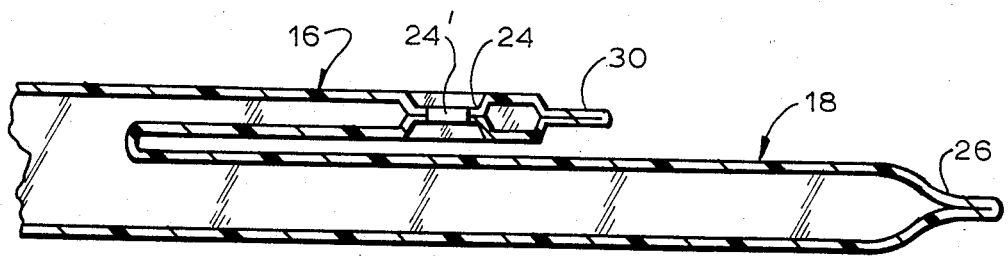
FIG. 2 is a sectional view thereof taken along the plane of FIG. 5—5 in FIG. 3.

FIGS. 1 and 2 illustrate an inner vacuum envelope 10 specifically designed for accomodating a parachute. The parachute has been removed from the envelope for purposes of clarity. The vacuum envelope is made from a relatively thin, extremely low gas transmission fabric. A one hundred gauge nylon film bonded to a 2.25 mil film called "Saranex 12" has been found to provide excellent results. "Saranex" films have been recognized for their low gas permeability. Their use in the food packaging industry is discussed, for example, in U.S. Pat. No. 4,105,818. Nylon is known for adding durability and puncture resistance. A nylon film is employed for this purpose in the prior art laminate illustrated in U.S. Pat. No. 3,912,843.

It is very important that the inner envelope be quite thin for purposes of the present invention. Since an uncompressed piece of equipment must be inserted therein, it must be of sufficient size to accomodate it without undue stress being placed thereon. When the equipment is compressed and the envelope evacuated, there is a considerable amount of excess material drawn tightly against the exterior surface of the equipment.

Since it is relatively thin, it does not add significantly to the dimensions of the compressed, evacuated assembly.

The outer envelope is substantially the same in configuration as the inner envelope and is designed to fit about it. Since it must only accomodate a greatly reduced volume, it may be constructed from a tougher, heavier material which will provide greater resistance to punctures or tears. In furtherance of this objective, the outside envelope material is constructed from the same Saranex/nylon material used for the inner envelope to which is bonded a 10 mil film of MP-1880 Polyurethane (J. P. Stevens & Co., Inc). This 10 mil film is bonded to the nylon side of the substrate. One side of the polyurethane is provided with a matte finish.

The polyurethane adds toughness, tear resistance, greater flex-life, puncture resistance and low temperature flexibility to the outer envelope. The absence of plasticizers or fillers therein insures that flexibility and toughness will be maintained for years. It is not particularly gas impermeable, however, and is accordingly bonded to a material having this property.

Each envelope is radio frequency heat sealed along a selected perimeter. The inner envelope material is folded or otherwise arranged such that the Saranex is on the inside. Saranex, a film composed of polyvinylidene chloride coated on both sides with polyethylene, is sealable to itself in such a manner. The nylon side is neither capable of sealing to itself nor to the Saranex.

The Saranex side of the outer envelope is also sealed to itself as it is desirable to position the tough polyurethane surface on the outside. The locations of the seals on the outer envelope correspond to those on the inner envelope as will be explained hereinafter.

A vacuum-packed assembly according to the present invention is manufactured in the following manner. The item to be packed is folded into a desired configuration. The inner envelope is heat sealed along certain lines leaving an opening which is large enough to receive the folded item easily. This opening is sealed once the item is inserted. A small opening should still be present through which the envelope can be evacuated. The item is compressed to a fraction of its original size and air is evacuated from the envelope. Once this procedure is complete, the small evacuation opening is sealed. The result is a relatively small, dense package encased in a thin, tightly adhered skin. This package is placed within the outer envelope which has been partially heat sealed in a manner corresponding to that of the inner envelope. If the inner package includes projecting portions, the outer envelope is designed to receive these portions. The package and outer envelope are positioned relative to each other so that this occurs. Once the opening through which the package is inserted is sealed, the outer envelope is evacuated to form a tough outer skin on the evacuated assembly. The evacuation opening is sealed to provide the finished product.

It will be appreciated that the vacuum-packed assembly may take any of a number of forms depending upon the item to be packed and the configuration of the receptacle into which it must fit. The method for deployment of the item is another factor which influences the design of the assembly. An example of a specifically shaped envelope and assembly including a parachute is provided in the drawings.

The inner envelope 10 shown in FIG. 1 includes a main body portion 12, an actuation neck 14, a pouch 16, and an extending end portion 18. With the exception of the pouch 16, the envelope is two-dimensional and may be laid flat.

Since a parachute must be deployed rapidly, the envelope must be designed to be torn apart quickly and easily when certain forces are applied thereto. As mentioned above, it must otherwise be resistant to punctures, tears, and environmental conditions. The actuation neck 14 is accordingly desired to receive the fabric bridle 20 of the parachute 22 which connects the top of the canopy to the drogue parachute (not shown). The bridle 20 includes a loop through which external connection is made. A circle weld 24 is formed within the loop in the actuation neck of the inner envelope and the center thereof removed. The outer envelope also includes a circle weld (seal) inside that of the inner envelope with the center removed. External connection with the loop is made by passing a member through the removed portions 24' of the envelopes and the bridle loop. The circle welds insure vacuum integrity is maintained in both envelopes. It will be appreciated that closed loop welds of other configurations could alternatively be employed at any location on the envelopes.

The neck 14 extends at an acute angle with respect to the main body 12 of the envelope. The heat seals 26 defining the borders of the neck 14 and body 12 also intersect at an acute angle. A wedge-shaped portion of the vacuum envelopes between the neck and body is removed to provide a sharp point from which the envelopes will tear through the seals when the drogue parachute pulls upon the neck. This point may be located where the intersecting seals adjoin.

The pouch 16 is used for containing four male transfer links 28 of the parachute. These links are color coded to identify whether they should be connected to the corresponding female receiver links of the front or rear risers. By employing such a pouch to accomodate the links, there is no undue stress upon the vacuum envelopes as the male links therein are maneuvered to be secured to the receiver links. An additional heat seal 30 extends across the top of the pouch to provide additional rigidity.

To form the pouch 16 in the inner envelope, a pair of overlapping sheets (or one folded over sheet) of vacuum envelope material is placed on a flat surface. A loop of desired size is then formed in the top sheet and folded down flat. The edges of the sheets, including the loop, are then heat sealed. Since the exterior surfaces of the sheets do not adhere to each other under heat sealing, the loop may simply be peeled up from the top sheet. The inner surfaces of the sheets will have been sealed to each other to form an envelope. Vacuum integrity is provided even where the loop was folded over. Additional heat seals 30' may be provided in order to trim the pouch to desired size. An opening is left at one end of the envelope for inserting the parachute. The four transfer links thereof are positioned within the pouch 16 and the bridle 20 within the neck 14 prior to closing the envelope for evacuation. Circle welds 24 within the openings in the links and bridle prevent them from being displaced during evacuation or thereafter and provide for external attachment.

The corresponding pouch in the outer envelope is formed prior to sealing the remainder of the envelope as the polyurethane will heat seal to itself. Circle welds are formed therein after it is positioned about the inner pouch.

As shown in FIGS. 2-3, the final product is a compact, wedge-shaped structure capable of fitting easily within a conventional ejection seat head box. The neck 14 and pouch 16 are both maneuverable with respect to the remainder of the package to allow the parachute 22 to be externally connected to the drogue parachute and aircrewman, respectively, without the risk of sacrificing vacuum integrity. Once the external envelope 32 has been applied, the vacuum packed assembly will resist puncturing and loss of vacuum even when subjected to the extreme environments encountered by today's aircraft.

The vacuum-packed parachute 22 disclosed herein is specifically designed to be employed in conjunction with an aircraft ejection seat. It is stored within a head box having flexible flaps and no lid. The head box need not be vacuum sealed.

After initiation of pilot ejection, the drogue parachute(s) are released from the seat. The static line from the drogues to the head box flaps tightens and the flap lock is released. Flap opening is initiated by the parachute withdrawal. The vacuum envelopes are ruptured as the drogues exert a considerable force upon the actuation neck 14. The acute angle formed between the neck and the main portion of the double envelope allows it to tear easily. Once vacuum integrity is lost, the parachute is extracted as additional forces are exerted upon the envelopes, thereby ripping them apart. Canopy deployment begins, the deployment envelope extracted, and soon the suspension lines are deployed. Line stretch is achieved and the riser transfer hardware (including links 28) is removed from its position in the head box. Man/seat separation and canopy opening then occur and a normal rate of descent is established.

Additional lines of weakness may be incorporated across the neck 14 or wherever desirable. One such line 34 is shown in dotted lines in FIG. 1. It is provided on one or both of the vacuum envelopes as desired in such a manner that loss of vacuum will not be threatened prior to pilot ejection. Since the inner Saranex layers of the envelopes will not heat seal to nylon, a nylon film is inserted within the envelope and extending between the main body 12 thereof and the neck 14. A heat "seal" is then made across the neck thereby scoring and weakening its connection to the remainder of the envelope. The nylon film is removed and the bridle 20 inserted therein.

It will be appreciated that similar assemblies may be constructed for other compressible articles such as sleeping bags and life rafts. Since these articles are deployed in much different manners and are stored in containers of varying shapes, the finished products will of course be quite different in configuration.

What is claimed is:

1. A vacuum-packed assembly comprising:
   a compressible article of survival equipment;
   a first flexible, substantially gas-impermeable envelope of relatively thin material encasing said compressible article, said article being compressed to a significant degree, said first envelope having sufficient size to receive said article in its uncompressed state and being evacuated to form a skin-tight covering about said compressed article, there being a considerable amount of excess first envelope material drawn against said compressed article; and
   a second flexible, substantially gas-impermeable envelope of relatively thicker material than said first envelope, having a smaller volume than said first envelope and having greater resistance to punctures, said second envelope encasing said compressed article and said first envelope and being evacuated to form a skin-tight covering thereabout.

2. A vacuum-packed assembly as defined in claim 1 wherein said second envelope comprises bonded layers of Saranex, nylon, and polyurethane.

3. A vacuum-packed assembly as defined in claim 1 wherein each of said envelopes includes a main envelope portion and a neck portion extending therefrom, said neck portions extending at acute angles with respect to said respective main envelope portions, said neck portion of said first envelope being positioned within said neck portion of said second envelope.

4. A vacuum-packed assembly as defined in claim 3 wherein each of said main envelope portions and said neck portions includes a heat-sealed border, said heat-sealed borders of said neck portions intersecting said respective heat-sealed borders of said main envelope portions at acute angles.

5. A vacuum-packed assembly as defined in claim 4 including a score line extending between at least one of said neck portions and its corresponding respective main envelope portion.

6. A vacuum-packed assembly comprising:
   a parachute including a bridle having a loop therein for connecting it to a drogue parachute;
   a first flexible, substantially gas-impermeable envelope of relatively thin material encasing said parachute, said parachute being compressed to a significant degree, said first envelope being evacuated to form a skin-tight covering about said compressed parachute;
   a second flexible, substantially gas-impermeable envelope of relatively thicker material than said first envelope and having greater resistance to punctures, said second envelope encasing said compressed parachute and said first envelope and being evacuated to form a skin-tight covering thereabout;
   each of said envelopes including a main envelope portion and a neck portion extending therefrom, said neck portions extending at acute angles with respect to said respective main envelope portions, said neck portion of said first envelope being positioned within said neck portion of said second envelope, said loop being positioned within said neck portion of said first envelope.

7. A vacuum-packed assembly as defined in claim 6 wherein said parachute includes at least one transfer link having an opening therein for connecting it with a riser, said transfer link being positioned within said first envelope, a closed loop seal formed within said first envelope and extending through said transfer link opening; a second closed loop seal formed within said second envelope and extending through said transfer link opening, the envelope material within said respective closed loop seals being removed to provide a passage.

8. A vacuum-packed assembly as defined in claim 7 wherein said bridle loop and transfer link are spaced apart a substantial distance from each other with respect to said vacuum-packed assembly.

9. A vacuum-packed assembly as defined in claim 8 having a substantially wedge-shaped configuration.

10. A vacuum-packed assembly as defined in claim 7 wherein said first and second envelopes are rupturable upon exertion of a force upon said respective neck portions commensurate with that which is normally exerted upon the opening of a drogue parachute connected to said bridle loop.

11. A vacuum-packed assembly as defined in claim 7 including a closed loop seal formed within said first envelope and extending through said bridle loop, a second closed loop seal formed within said second envelope and extending through said bridle loop, the envelope material within said closed loop seals through said bridle loop being removed to provide a passage there-through.

12. A vacuum-packed parachute assembly comprising:
- a parachute including a canopy, a drogue bridle connected to said canopy, said drogue bridle including a loop, and a transfer link having an opening extending therethrough;
- said parachute being compressed to a significant degree;
- an evacuated envelope of substantially gas-impermeable material encasing said parachute and forming a skin-tight covering thereabout, said envelope including a main body portion and a detachable neck portion extending therefrom, said neck portion forming at least one acute angle with said main body portion, said bridle loop being positioned within said neck portion;
- a first closed loop seal formed within said neck portion of said envelope and extending through said bridle loop, the envelope material within said first closed loop seal being removed to provide a passage through said bridle loop;
- a second closed loop seal formed within said envelope and extending through said transfer link opening, the envelope material within said second closed loop seal being removed to provide a passage through said transfer link;
- said envelope being rupturable upon the exertion of opposing forces thereon via said bridle loop and said transfer link due to the opening of a drogue parachute connected to said drogue bridle and the descent of an aircrewman connected to said transfer link.

13. A vacuum-packed parachute as defined in claim 12 including a second evacuated envelope encasing said evacuated envelope which encases said parachute, said second evacuated envelope being of relatively thicker and more puncture-resistant material.

14. A vacuum-packed parachute as defined in claim 13 wherein said second evacuated envelope comprises bonded layers of Saranex, nylon, and polyurethane.

15. A vacuum-packed parachute as defined in claim 12 wherein said main body portion and said neck portion of said envelope each include a heat-sealed border, said heat-sealed border of said neck portion intersecting said heat-sealed border of said main body portion at an acute angle.

16. A vacuum-packed parachute as defined in claim 12 having a relatively thick end and a relatively thin end, said neck portion extending from said thick end.

17. A vacuum-packed parachute as claimed in claim 12 including a score line extending between said main body portion of said neck portion.

* * * * *